Sept. 5, 1961 U. H. MARTENSEN 2,998,853
WHEEL SUPPORT FOR IMPLEMENTS
Filed Sept. 25, 1958 3 Sheets-Sheet 1
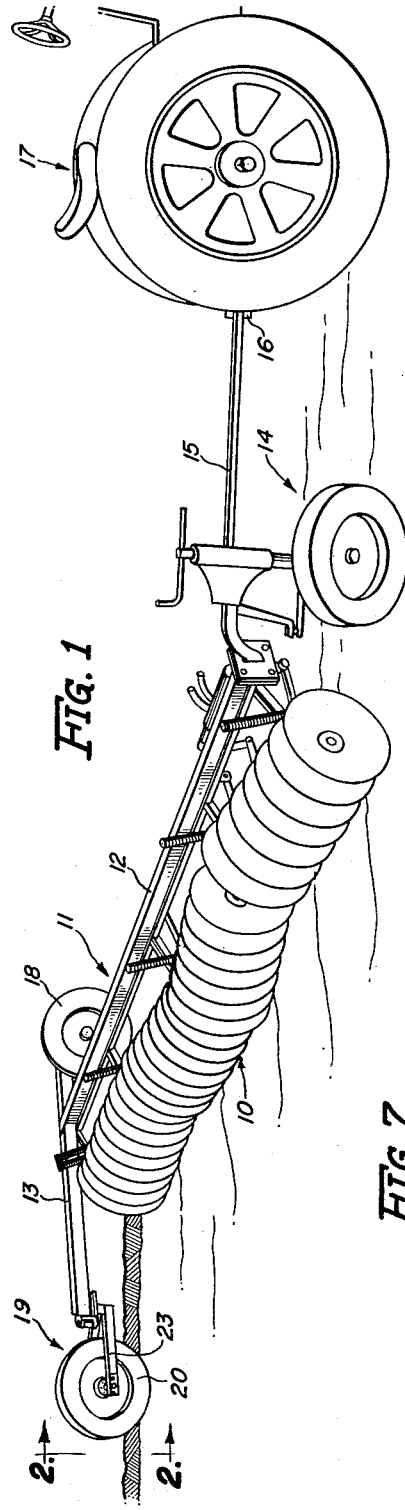
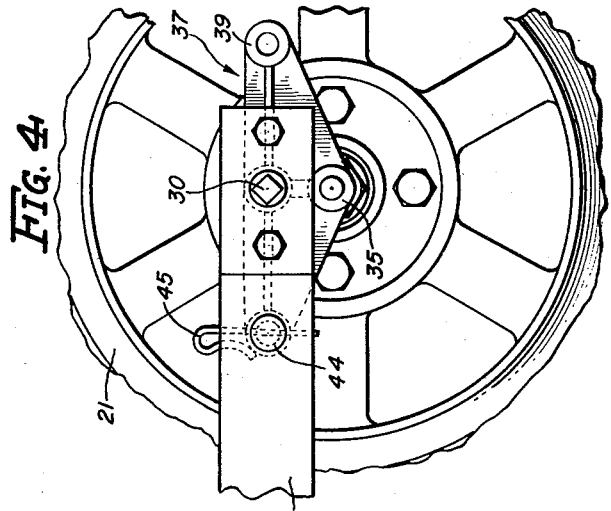
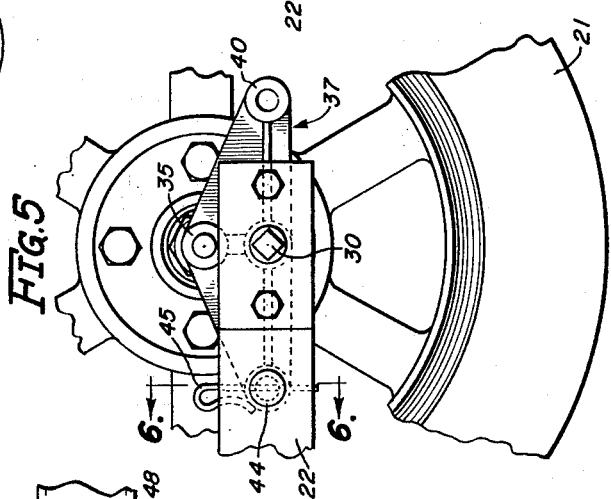
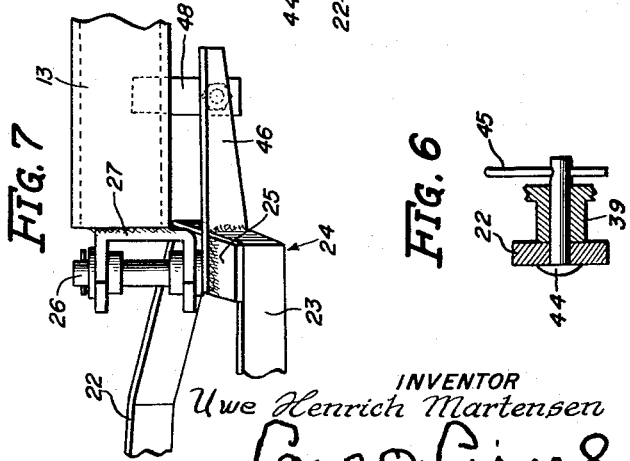
INVENTOR
Uwe Henrich Martensen
Paul O. Pippel
ATTORNEY

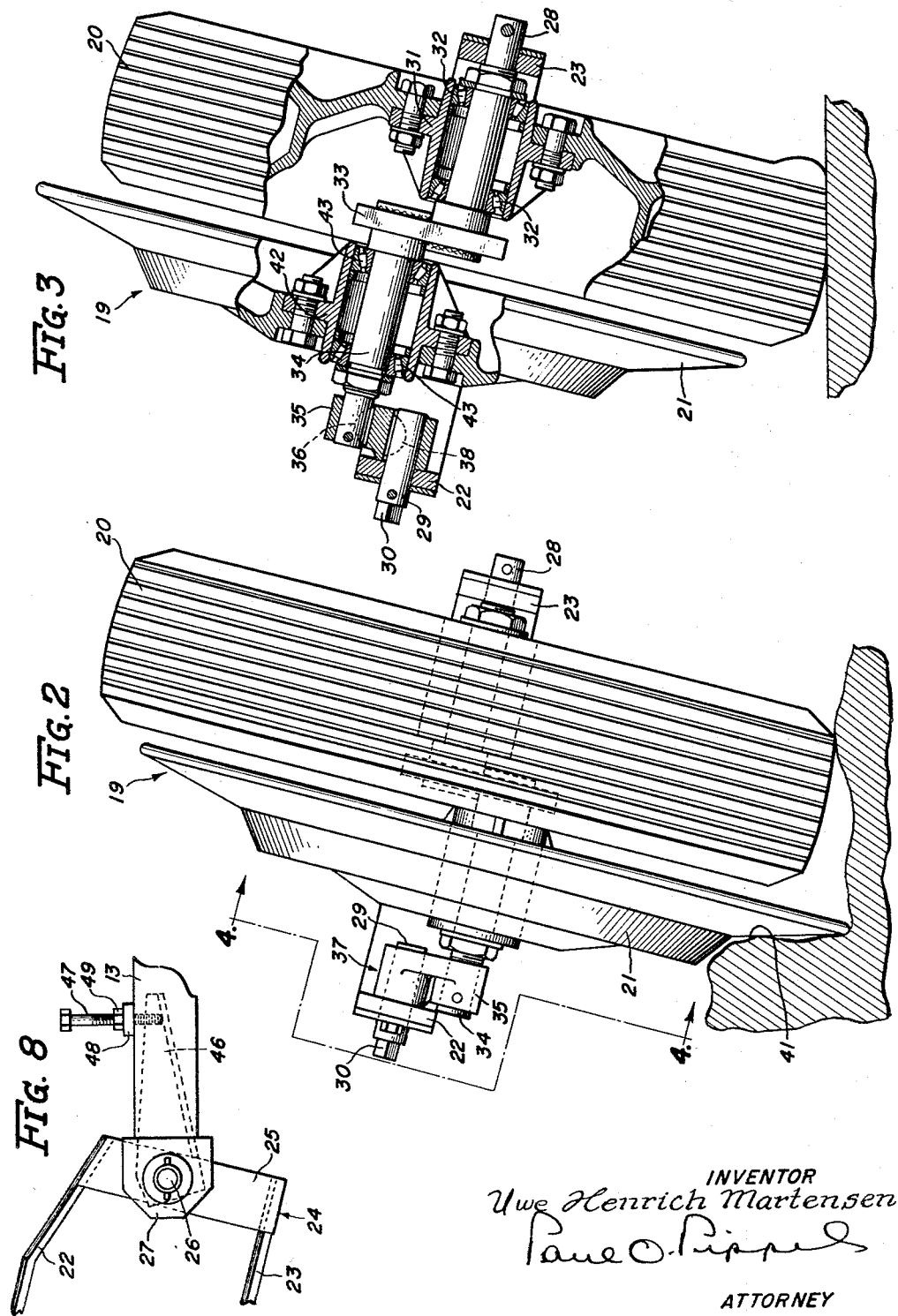

Sept. 5, 1961  U. H. MARTENSEN  2,998,853
WHEEL SUPPORT FOR IMPLEMENTS
Filed Sept. 25, 1958  3 Sheets-Sheet 3
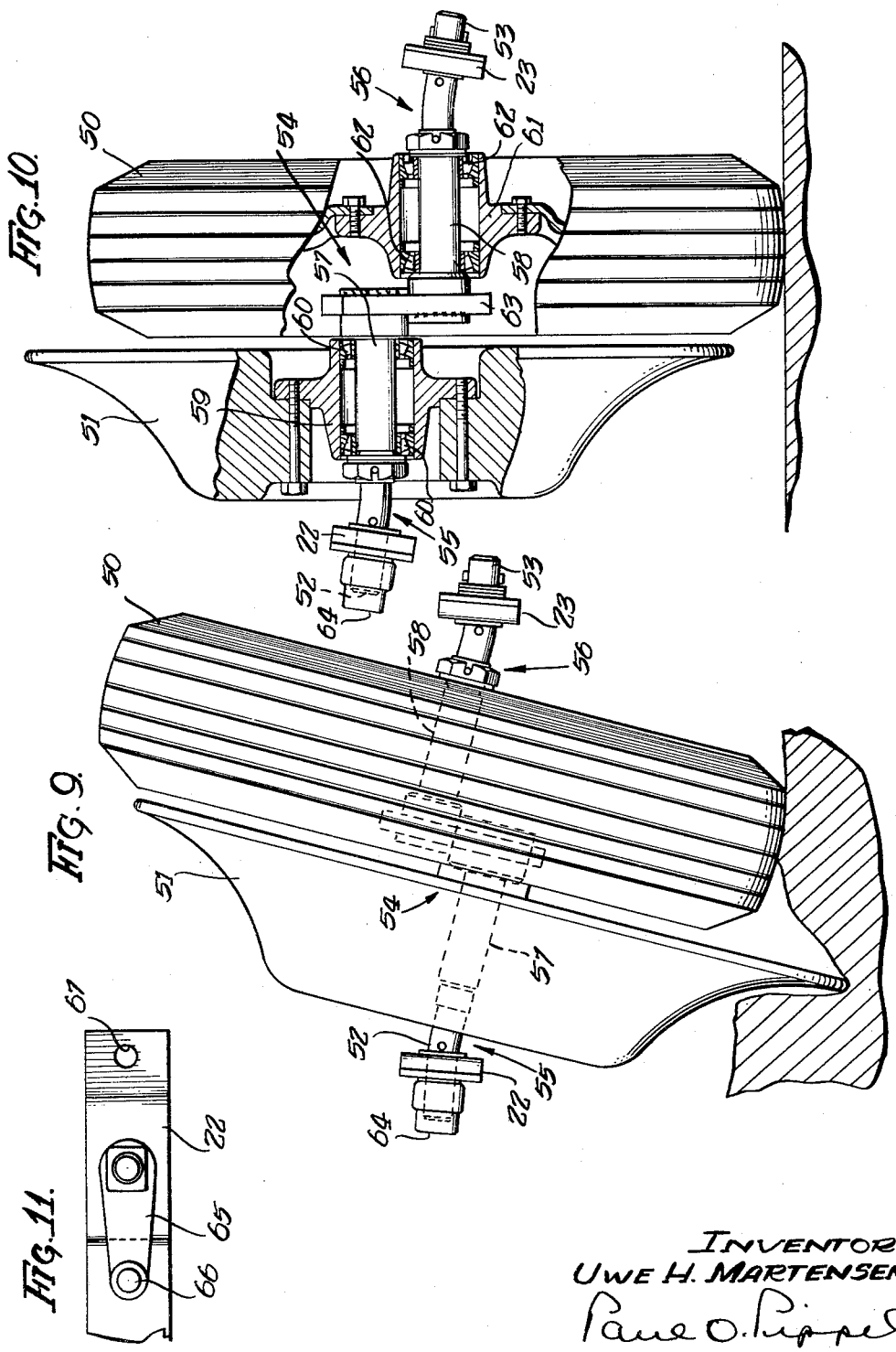
INVENTOR
UWE H. MARTENSEN
Paul O. Pippel
ATTORNEY

United States Patent Office 2,998,853
Patented Sept. 5, 1961

2,998,853
WHEEL SUPPORT FOR IMPLEMENTS
Uwe H. Martensen, Burlington, Ontario, Canada, assignor to International Harvester Company, Chicago, Ill., a corporation of New Jersey
Filed Sept. 25, 1958, Ser. No. 763,285
7 Claims. (Cl. 172—383)

This invention relates to agricultural implements and particularly to supporting wheels therefor. More specifically, the invention concerns a rear furrow and supporting wheel unit for an implement.

In large, heavy implements such as a wide angle harrow plow or disk tiller, it is important to provide means to support the rear end of the plow as well as to absorb the side draft thereon. Therefore, an object of this invention is to provide in an implement of the type referred to, improved furrow wheel means for the rear end of a plow.

Another object of the invention is to provide in a disk tiller or the like, a furrow wheel unit which not only provides adequate support for the rear end of the implement in the operating position thereof and offsets the side draft thereon, but also provides adequate support for the implement in its transport position.

Another object of the invention is to provide in a disk tiller or the like, a tail or furrow wheel assembly comprising a pair of wheels, one pneumatic, to provide support for the rear end of the implement in both operating and transport positions, and another a narrow rim metal wheel adapted to bear against the furrow wall and offset side draft during operation, the latter wheel being movable relative to the pneumatic wheel to a position out of operative engagement with the ground.

Another object of the invention is to provide a novel tail wheel unit for an implement wherein the tail wheel unit is adapted to offset side draft on the implement and is disposed at an angle to the vertical in the operating position thereof, and wherein the tail wheel unit changes its angle as the implement is raised to transport position until the unit is substantially vertical to facilitate transporting the implement over the ground.

Other objects and advantages of the invention will become clear from the following detailed description when read in conjunction with the accompanying drawings wherein:

FIGURE 1 is a view in perspective of an implement of the type with which this invention finds utility, connected in trail-behind relation to a tractor;

FIGURE 2 is a rear elevation of the tail wheel assembly shown in FIGURE 1, taken on the line 2—2 thereof, and showing the relationship of parts in the operating position of the implement;

FIGURE 3 is a partial sectional view similar to FIGURE 2 showing the transport position of the tail wheel assembly;

FIGURE 4 is a fragmentary view on the line 4—4 of FIGURE 2;

FIGURE 5 is also a fragmentary view in side elevation showing another position of the parts similar to that shown in FIGURE 3;

FIGURE 6 is a section taken on the line 6—6 of FIGURE 5;

FIGURE 7 is an enlarged detail of the means by which the support for the furrow wheel assembly is mounted on the implement frame;

FIGURE 8 is the plan view of the structure shown in FIGURE 7;

FIGURE 9 shows a modified form of the furrow wheel assembly of this invention wherein the wheel elements are shown in their operating position in a manner similar to FIGURE 2;

FIGURE 10 is a partial sectional view of the structure shown in FIGURE 9 illustrating the transport position, and FIGURE 11 is a fragmentary view showing the means for rotating the wheel shaft 180° and holding it in position.

An implement of the type with which this invention is associated is shown in FIGURE 1. The details of construction of such an implement form no part of this invention but it may be understood that a series of disks 10 are carried by an implement frame 11 including a frame member 12 extending diagonally of the direction of travel upon which the disks are mounted, a wheel-carrying frame or truck section 13 at the rear and a front furrow wheel assembly 14. The implement is provided with a hitch structure 15 connected to the drawbar 16 of a tractor 17. The wheel-carrying frame section 13 supports a land wheel 18 and a rear furrow wheel assembly 19.

Rear furrow wheel unit 19 comprises a pneumatic tired wheel 20, and closely adjacent and parallel thereto a cast iron furrow wheel 21, both wheels being disposed between the arms 22 and 23 of a fork 24 having a transverse connector 25 at its forward end from which the arms 22 and 23 extend rearwardly. A vertical spindle is affixed to the cross-piece 25 and is pivotally received in openings provided in a clevis 27 affixed, as by welding, to the rear ends of the frame member 13.

The rear ends of arms 22 and 23 are parallel and are apertured to receive axially spaced coaxial shaft sections 28 and 29, the latter shaft section being rotatable in the opening in arm 22 and having a squared outer end 30 to fit a suitable wrench by which the shaft may be turned. The outer end of shaft 28 is of somewhat reduced diameter and hub 31 of wheel 20 is mounted on the part of shaft 28 inside arm 23 through the intermediary of a pair of bearings 32.

The inner end of shaft 28 has affixed thereto an eccentric member 33 to which is affixed one end of an auxiliary shaft 34 offset radially and axially from main shaft sections 28 and 29. The outer end of shaft 34 is reduced and received in a boss 35 to which it is connected by a key 36, boss 35 being formed on a triangular adjusting member 37, which is mounted by means of a key 38 on shaft section 29, at a location vertically spaced from the boss 35.

As shown in FIGURES 4 and 5, a pair of bosses 39 and 40 form a part of the triangular member 37 at opposite sides of the shaft section 29. In FIGURES 2 and 4 of the drawings the dual wheel arrangement of pneumatic wheel 20 and cast iron wheel 21 is in the position corresponding to the operating position of the implement, with the narrow periphery cast wheel 21 bearing against the furrow wall 41 to take the side draft forces acting on the plow, and with the pneumatic wheel 20 riding in the bottom of the furrow on the furrowward side of the cast wheel 21. In this position the triangular adjusting member 36 is as shown in FIGURE 4, with boss 35 below the axis shafts 28 and 29. The cast furrow wheel 21 is provided with a hub 42 and is mounted on auxiliary shaft 34 through the intermediary of bearings 43. Thus in FIGURES 2 and 4 the eccentric shaft 34 carrying wheel 21 is below the axes of the main shaft sections 28 and 29 and the dual wheels cooperate to take the side draft of the plow and support the rear end thereof.

When the series of disks 10 is to be raised for transporting the implement over level ground, it is desirable that the relatively broad periphery pneumatic wheel 20 remain in engagement with the ground to support the rear end of the disk tiller. However, to retain cast wheel 21 in engagement with the ground in the position of the part shown in FIGURE 2 during transport would make the implement difficult to steer and would cause wear to the cast wheel. Therefore, wheel 21 is moved vertically relative to wheel 20 to an inoperative position out of engagement with the ground. This is accomplished by the operator applying a wrench to the squared end 30 of shaft section 29 and revolving triangular member 37 until the parts are in the position of FIGURES 3 and 5. The wheels 20 and 21 are rigidly held in their operating position by the provision of a pin 44 which passes through an opening in arm 22 and boss 40 of the triangular adjusting member 37 and is held in place by a cotter key 45 passed through an opening in the inner end of pin 44. In the raised position of the cast wheel 21 shown in FIGURES 3 and 5, the pin 44 has been removed until the triangular member is revolved and boss 39 registers with the opening in arm 22 to receive the pin 44.

It may be noted that an arm 46 is affixed to cross piece 25 of fork 24 and projects forwardly therefrom for engagement with the threaded end of a bolt 47 adjustably received in the lower end of a lug 48 secured to and depending from the rear wheel truck frame 13, the bolt being held in its adjusted position by a nut 49. Bolt 47, by engaging arm 46, limits lateral swinging of the furrow wheel assembly 19 relative to the truck frame 13 about the axis of spindle 26, the lead of the dual wheel unit with respect to the furrow wall 41 being adjusted by manipulation of bolt 47.

In the modified form of the invention shown in FIGURES 9 to 11, a pneumatic tired wheel 50 and a cast iron wheel 51 are provided similar to the wheels 20 and 21 shown in FIGURES 1 to 8 inclusive. Wheels 50 and 51 are disposed between the arms 22 and 23 of the fork 24, and the rear ends of these arms are apertured to rotatably receive the coaxial end portions 52 and 53 of a wheel shaft assembly 54.

The shaft assembly or unit 54 comprises a pair of members 55 and 56 having bearing sections 57 and 58, each of which is bent at an angle to end portions 52 and 53 of the respective shaft sections 55 and 56.

As shown in FIGURE 10, wheel 51 has a hub 59 which is mounted by bearings 60 on bearing section 57 of shaft member 55. Similarly, wheel 50 has a hub 61 which is mounted by bearings 62 on bearing section 58 of shaft member 56.

The shaft sections or members 55 and 56 are radially offset, with the bearing portions 57 and 58 parallel and with their inner ends overlapping in juxtaposition and affixed to an eccentric 63.

In FIGURES 9 and 10 it will be observed that while bearing sections 57 and 58 are parallel and side by side, the end portions 52 and 53 thereof are bent in opposite directions at angles thereto and are in alignment so that they rotate about a common axis. Rotation of the shaft assembly 54 causes the bearing sections 57 and 58 to execute a gyratory motion about the axis of end portions 52 and 53 from the operating position of FIGURE 9 to the transport position of FIGURE 10. In the operating position the sharp edge wheel 51 bears against the furrow wall and additional vertical support therefor is provided by engagement of pneumatic tired wheel 50 with the ground. Due to the gyratory motion of the bearing sections 57 and 58, upon rotation of the shaft assembly 54, 180° to the transport position of FIGURE 10, the bearing sections 57 and 58 change their position from a laterally and downwardly inclined angle to the position of FIGURE 10 parallel to the ground line. In FIGURE 10, by rotation of the shaft assembly 54, bearing section 57 has moved from the position of FIGURE 9 below bearing section 58 to a position thereabove with wheel 51 out of engagement with the ground. This eliminates transportation problems involved in allowing the narrow periphery wheel 51 to travel on the surface of the ground, and transport is further facilitated by causing the wheels to ride in planes perpendicular to the ground line.

Rotation of the shaft assembly 54 is accomplished by the provision of a square nut 64 affixed to the end of end portion 52 and having secured thereto an arm 65 apertured at its end to receive a bolt 66 alternately insertable in registering openings 67 provided in arm 22, 180° apart.

It is believed that the operation of the novel tail wheel unit of this invention will be clearly understood from the foregoing description. It should likewise be understood that the invention has been described in its preferred embodiment only, and that modifications may be made therein without departing from the spirit of the invention or the scope of the appended claims.

What is claimed is:

1. A furrow and transport wheel assembly for an implement comprising a support, a pair of separate coaxial main shaft sections mounted on the support, a wheel rotatably mounted on one of said sections, an auxiliary shaft section radially spaced from and spanning said main shaft sections, means for mounting said auxiliary shaft section on said main shaft sections for rotation in an orbit about the axes of the latter to effect movement of said auxiliary shaft section relative to said main shaft sections, means for holding said auxiliary shaft section in selected positions and a wheel mounted on said auxiliary shaft section.

2. A furrow and transport wheel assembly for an implement having a frame, comprising a pair of radially offset separate shafts operatively connected to the frame at their outer ends for rotation relative thereto; means interconnecting the inner ends of said shafts in radially spaced relation for rotation of the inner end of one of said shafts in an orbit about the axis of the other shaft, means connected between said other shaft and the frame for holding said other shaft in selected positions relative to said one of said shafts, and wheels rotatably mounted on said shafts.

3. A rear furrow and transport wheel assembly for an implement, comprising frame means including laterally spaced portions, a main shaft rotatably mounted at one end in one of said portions and extending inwardly therefrom, an auxiliary shaft parallel to and radially offset relative to said main shaft, means carried by the inner end of said main shaft having means thereon supporting the inner end of said auxiliary shaft for movement in a circular path concentric with the axis of the main shaft, means mounted on the other of said frame portions for rotatably supporting the other end of said auxiliary shaft, said last mentioned supporting means being rotatable relative to said frame means to swing said auxiliary shaft in a circular path concentric with the axis of said main shaft, and wheels mounted on said shafts.

4. The invention set forth in claim 3, wherein said last mentioned supporting means comprises a member rotatably mounted on said other frame portion on an axis coaxial with said main shaft, and wherein means are provided for revolving said member about its axis in selected adjusted positions to bodily shift the position of one of said wheels relative to the other and means for securing said member in said selected adjusted positions.

5. The invention set forth in claim 4, wherein the wheel on the main shaft is a pneumatic tired wheel in engagement with the ground at all times and the wheel on the auxiliary shaft is a metal wheel with a relatively narrow rim engageable with the furrow wall in the operating position of the implement and movable upwardly with respect to the pneumatic wheel by rotation of said member out of engagement with the ground in the transport position of the implement.

6. A furrow and transport wheel assembly for an implement having a frame, comprising a pair of shaft members having outer ends coaxially mounted on the frame on a laterally extending downwardly inclined axis and inner bearing sections disposed at an angle to said axis and lying in parallel planes, wheels rotatably mounted on said bearing sections in side by side relation and bodily revoluble with said bearing sections about the axis of said outer ends to alternately dispose the axis of one of said wheels above the other, and means for rotating the outer ends of said shaft members.

7. The invention set forth in claim 6, wherein the angle of said bearing sections to the axis of the outer ends of said shaft members is so arranged that during rotation of said shaft members the wheels move from an angled relation to a vertical plane to a position substantially parallel to said plane.

References Cited in the file of this patent

UNITED STATES PATENTS

| | | |
|---|---|---|
| 230,192 | Olmsted | July 20, 1880 |
| 1,207,443 | Smith | Dec. 5, 1916 |
| 2,021,075 | McGinness | Nov. 12, 1935 |
| 2,348,445 | Bayer | May 9, 1944 |
| 2,648,270 | Silver et al. | Aug. 11, 1953 |
| 2,779,261 | Northcote et al. | Jan. 29, 1957 |